United States Patent [19]

Hoogenboom

[11] Patent Number: 5,345,408
[45] Date of Patent: Sep. 6, 1994

[54] INVERSE DISCRETE COSINE TRANSFORM PROCESSOR

[75] Inventor: Christopher L. Hoogenboom, La Jolla, Calif.

[73] Assignee: GI Corporation, Hatboro, Pa.

[21] Appl. No.: 46,382

[22] Filed: Apr. 19, 1993

[51] Int. Cl.⁵ .......................................... G06F 15/332
[52] U.S. Cl. .................................................. 364/725
[58] Field of Search ................................ 364/725, 726

[56] References Cited

U.S. PATENT DOCUMENTS

| | | |
|---|---|---|
| 4,760,543 | 7/1988 | Ligtenberg et al. . |
| 4,791,598 | 12/1988 | Liou et al. ............................. 364/725 |
| 4,831,440 | 5/1989 | Borgers et al. . |
| 4,837,724 | 6/1989 | Borgers et al. . |
| 4,841,464 | 6/1989 | Guichard et al. . |
| 4,849,922 | 7/1989 | Riolfo . |
| 4,918,527 | 4/1990 | Penard et al. . |
| 5,031,038 | 7/1991 | Guillemot et al. . |
| 5,053,985 | 10/1991 | Friedlander et al. ................ 364/725 |
| 5,126,962 | 6/1992 | Chiang ................................. 364/725 |
| 5,140,542 | 8/1992 | Taliercio et al. . |
| 5,181,183 | 1/1993 | Miyazaki . |
| 5,197,021 | 3/1993 | Cucchi et al. ........................ 364/725 |
| 5,202,847 | 4/1993 | Bolton et al. ........................ 364/725 |
| 5,218,565 | 6/1993 | Mou et al. ........................ 364/750.5 |
| 5,249,146 | 9/1993 | Uramoto et al. ..................... 364/725 |

OTHER PUBLICATIONS

M. T. Sun, et al., "A 16×16 Discrete Cosine Transmform Chip," *SPIE vol. 845 Visual Communications and Image Processing II,* 1987, pp. 13-15.

M. T. Sun, et al., "A Concurrent Architecture for VLSI Implementation of Discrete Cosine Transform," *IEEE Transactions on Circuits and Systems,* vol. CAS-34, No. 8, Aug., 1987, pp. 992-994.

*Primary Examiner*—Tan V. Mai
*Attorney, Agent, or Firm*—Barry R. Lipsitz

[57] ABSTRACT

A method and apparatus are provided for inverse transforming a matrix of discrete cosine transform (DCT) coefficients. The DCT coefficients are processed at least two bits at a time to obtain the vector dot products thereof with a DCT kernel matrix. A matrix of the vector dot products is transposed to obtain a transposed matrix of dot product elements. The dot product elements of the transposed matrix are processed at least two bits at a time to obtain the vector dot products thereof with the DCT kernel matrix. The resultant dot products are interleaved into a proper order and buffered in a series of output registers. Further efficiencies are achieved by implementing a post-add stage of an IDCT flowgraph prior to the output registers.

21 Claims, 4 Drawing Sheets

INVERSE DISCRETE COSINE TRANSFORM PROCESSOR

BACKGROUND OF THE INVENTION

The present invention relates to the communication of digital video signals, and more particularly to a method and apparatus for implementing an inverse discrete cosine (IDCT) processor to recover transform coefficients.

Television signals are conventionally transmitted in analog form according to various standards adopted by particular countries. For example, the United States has adopted the standards of the National Television System Committee ("NTSC"). Most European countries have adopted either PAL (Phase Alternating Line) or SECAM (Sequential Color And Memory) standards.

Digital transmission of television signals can deliver video and audio services of much higher quality than analog techniques. Digital transmission schemes are particularly advantageous for signals that are broadcast by satellite to cable television affiliates and/or directly to home satellite television receivers. It is expected that digital television transmitter and receiver systems will replace existing analog systems just as digital compact discs have largely replaced analog phonograph records in the audio industry.

A substantial amount of digital data must be transmitted in any digital television system. This is particularly true where high definition television ("HDTV") is provided. In a digital television system, a subscriber receives the digital data stream via a receiver/descrambler that provides video, audio, and data to the subscriber. In order to most efficiently use the available radio frequency spectrum, it is advantageous to compress the digital television signals to minimize the amount of data that must be transmitted.

The video portion of a television signal comprises a sequence of video "frames" that together provide a moving picture. In digital television systems, each line of a video frame is defined by a sequence of digital data referred to as "pixels." A large amount of data is required to define each video frame of a television signal. For example, 7.4 megabits of data is required to provide one video frame at NTSC resolution. This assumes a 640 pixel by 480 line display is used with 8 bits of intensity value for each of the primary colors red, green and blue. High definition television requires substantially more data to provide each video frame. In order to manage this amount of data, particularly for HDTV applications, the data must be compressed.

Video compression techniques enable the efficient transmission of digital video signals over conventional communication channels. Such techniques use compression algorithms that take advantage of the correlation among adjacent pixels in order to derive a more efficient representation of the important information in a video signal.

One of the most effective and frequently used classes of algorithms for video compression is referred to as "transform coders." In such systems, blocks of video are linearly and successively transformed into a new domain with properties significantly different from the image intensity domain. The blocks may be nonoverlapping, as in the case of the discrete cosine transform (DCT), or overlapping as in the case of the lapped orthogonal transform (LOT). Systems using the DCT are described in Chen and Pratt, "Scene Adaptive Coder," *IEEE Transactions on Communications*, Vol. COM-32, No. 3, March 1984, and in U.S. Pat. No. 4,791,598 entitled "Two-Dimensional Discrete Cosine Transform Processor" to Liou, et al., issued Dec. 13, 1988. A system using the LOT is described in Malvar and Staelin, "The LOT: Transform Coding Without Blocking Effects," *IEEE Transactions on Acoustics, Speech, and Signal Processing*, Vol. 37, No. 3, April 1989.

Video transforms are used to reduce the correlation that exists among samples of image intensity (pixels). Thus, these transforms concentrate the energy into a relatively small number of transform coefficients. Most common transforms have properties that easily permit the quantization of coefficients based on a model of the human visual system. For example, the DCT produces coefficients with amplitudes that are representative of the energy in a particular band of the frequency spectrum. Therefore, it is possible to utilize the fact that the human viewer is more critical of errors in the low frequency regions of an image than in the high frequency or detailed areas. In general, the high frequency coefficients are always quantized more coarsely than the low frequencies.

The output of the DCT is a matrix of coefficients which represent energy in the two-dimensional frequency domain. Most of the energy is concentrated at the upper left corner of the matrix, which is the low frequency region. If the coefficients are scanned in a zigzag manner, starting in the upper left corner, the resultant sequence will contain long strings of zeros, especially toward the end of the sequence. One of the major objectives of the DCT compression algorithm is to create zeros and to bunch them together for efficient coding.

Coarse quantization of the low frequency coefficients and the reduced number of nonzero coefficients greatly improves the compressibility of an image. Simple statistical coding techniques can then be used to efficiently represent the remaining information. This usually involves the use of variable length code words to convey the amplitude of the coefficients that are retained. The smaller amplitudes which occur the most frequently are assigned short code words. The less probable large amplitudes are assigned long code words. Huffman coding and arithmetic coding are two frequently used methods of statistical coding. Huffman coding is used in the system of Chen and Pratt referred to above. Arithmetic coding is described in Langdon, "An Introduction to Arithmetic Coding," *IBM Journal for Research Development*, Vol. 28, No. 2, March 1984.

In order to reconstruct a video signal from a stream of transmitted coefficients, it is necessary to perform the inverse of the transform (e.g., DCT) that was used to encode the signals. Typically, the transform coefficients are communicated in $n \times n$ blocks of coefficients, such as $8 \times 8$ or $16 \times 16$ blocks. In order to build a practical system, it is advantageous to implement the IDCT processor on a integrated circuit chip, such as a very large scale integration (VLSI) design. Ideally, the VLSI design will calculate the IDCT quickly, accurately and with minimal hardware. In reality, the size of the VLSI hardware increases as the speed and accuracy of the IDCT circuit go up. Thus, trade-offs must be made to provide a compact VLSI design that provides sufficient speed and accuracy.

Previously noted U.S. Pat. No. 4,791,598 discloses a DCT processor that can be used as part of a video band-width or image compression system. A first one-dimensional DCT processor simultaneously computes an entire row or column of vector inner products by using distributed arithmetic and decimation-in-frequency to reduce the amount of memory capacity required. Partial sums are used to further reduce the memory size. The one-dimensional transformed matrix from the first processor is stored in a transposition memory and the transpose of the stored matrix is applied to a second one-dimensional DCT processor of similar circuitry which computes the desired two-dimensional DCT of the input data matrix. The DCT processor can be implemented on a single chip.

A disadvantage of the DCT processor disclosed in U.S. Pat. No. 4,791,598 is that it requires two separate one-dimensional DCT processors. The DCT processor disclosed in the patent also processes coefficient data only one bit at a time, rendering real-time processing difficult.

It would be advantageous to provide an inverse discrete cosine transform processor that provides real-time operation and can be implemented in a straightforward manner in VLSI. It would be further advantageous to provide an IDCT implementation in which a plurality of bits from each coefficient are processed during each clock cycle, to facilitate the throughput of data and enable real-time operation with a reasonable hardware size. It would be still further advantageous to implement the IDCT processor using bit serial arithmetic.

The present invention provides an IDCT processor having the aforementioned advantages.

SUMMARY OF THE INVENTION

In accordance with the present invention, an inverse discrete cosine transform processor is provided for use in recovering pixel data from blocks of DCT coefficients. Each block of DCT coefficients contains $N \times N$ coefficients, arranged in N arrays of N coefficients. First means successively process each of the N arrays in a block of DCT coefficients. The first processing means include (i) means responsive to a clock cycle for forming an address by combining at least two bits from each of the N coefficients contained in an array being processed, wherein a first stream of successive addresses is produced during successive clock cycles, (ii) means responsive to the first stream of addresses for outputting successive partial dot products between each of the N coefficients contained in said array being processed and a DCT kernel matrix, and (iii) means for accumulating and combining the successive partial dot products to form a complete dot product for each of the N coefficients of said array being processed, said complete dot products for all N arrays of said block defining an $N \times N$ matrix of dot product elements corresponding to the $N \times N$ coefficients contained in said block. Means are provided for transposing the $N \times N$ matrix of dot product elements to provide a transposed matrix having N arrays of N elements. Second means successively process each of the N arrays of dot product elements in the transposed matrix. The second processing means include (i) means responsive to a clock cycle for forming an address by combining at least two bits from each of the N elements contained in an array of said transposed matrix being processed, wherein a second stream of successive addresses is produced during successive clock cycles, (ii) means responsive to the second stream of addresses for outputting successive partial dot products between each of the N elements contained in said array of the transposed matrix being processed and the DCT kernel matrix, and (iii) means for accumulating and combining said successive partial dot products for each element of the array of the transposed matrix being processed to form a complete dot product for each element, said complete dot products for all N arrays of said transposed matrix defining a block of $N \times N$ inverse transform elements corresponding to the $N \times N$ coefficients contained in said block of DCT coefficients.

The first and second processing means can process arrays of DCT coefficients and transposed dot product elements on an interleaved basis. In such an arrangement, the processing of an array of DCT coefficients is followed by the processing of an array of transposed dot product elements, and the processing of the array of transposed dot product elements is followed by the processing of the next successive array of DCT coefficients from said block. The dot product elements resulting from the processing of each array of DCT coefficients are written into a transposition memory. Alternate blocks of DCT coefficients are processed by writing the dot product elements derived therefrom into rows or columns of the transposition memory. Thus, if the processed arrays of a first block of DCT coefficients are written into the transposition memory on a row by row basis and read therefrom on a column by column basis, the next successive block of DCT coefficients will have the dot product elements for each of its arrays written into the transposition memory on a column by column basis and read therefrom on a row by row basis. The complete dot products derived from the arrays of the transposition memory are not rewritten into the transposition memory; they are output from the IDCT processor.

In a first embodiment, the first and second processing means are implemented using alternate passes through a single dot product engine. Means are provided for inputting bits from the block of DCT coefficients during a first pass through the dot product engine to produce an array of the $N \times N$ matrix of dot product elements. Means are provided for inputting bits from a column or row of the transposed matrix during a second pass through the dot product engine to produce an array of the block of $N \times N$ and inverse transform elements. The dot product engine can comprise shift register means for receiving coefficients from the block of DCT coefficients during the first pass and for receiving dot product elements from the transposed matrix during the second pass. The shift register means are responsive to the clock cycles for outputting said streams of successive addresses. Look up table means responsive to the addresses output the successive partial dot products to the accumulating means.

The shift register means can comprise a first bank of shift registers for receiving even coefficients during the first pass and even dot product elements during the second pass. A second bank of shift registers is provided for receiving odd coefficients during said first pass and odd dot product elements during the second pass. The look up table means comprise a first look up table responsive to addresses produced by the first bank of shift registers and a second look up table responsive to addresses produced by the second bank of shift registers. In such an embodiment, the accumulating and combining means comprise a first set of accumulators following the first look up table and a second set of accumulators following the second look up table. Each set of accumulators is followed by means for alternatingly adding and subtracting selected accumulator outputs to implement a post-add stage of an IDCT flowgraph.

A plurality of output registers are provided following the means for alternatingly adding and subtracting selected accumulator outputs. The output registers interleave and buffer even and odd inverse transform elements to provide the inverse transform elements in a desired order at a desired output rate.

In the embodiment described above, the first bank of shift registers comprises N/2 pairs of registers, each pair providing two bits of an N-bit address per clock cycle. The second bank of shift registers comprises N/2 pairs of registers, each pair providing two bits of an N-bit address per clock cycle. Each pair of registers in the first and second banks comprises a first register for storing even bits of DCT coefficients and dot product elements and a second register for storing odd bits of DCT coefficients and dot product elements. In an illustrated embodiment, each of the DCT coefficients and the dot product elements are processed in M-bit words. The pairs of shift registers in the first bank have lengths which successively decline by two, commencing with a length of M-1. The pairs of shift registers in the second bank have lengths which successively decline by two, commencing with a length of M-2.

The IDCT processor can form the various complete dot products using twos complement arithmetic. When using twos complement arithmetic, all but the last one of a plurality of successive partial dot products is added to form a sum. The last partial dot product is subtracted from the sum to provide the complete dot product. This final subtraction can be provided in the look up tables.

In an alternate embodiment, two separate dot product engines are provided in series. A first dot product engine receives bits from a block of DCT coefficients to produce the arrays of the N×N matrix of dot product elements. The second processing means comprise a second dot product engine for receiving bits from the transposed matrix to produce the arrays of the block of N×N inverse transform elements. Each of the two separate dot product engines are essentially identical to the single dot product engine embodiment described above, except that the dot product elements in the transposed matrix are not fed back to the input of the dot product engine. Instead, the first dot product engine processes the original DCT coefficients and the second dot product engine processes the arrays of dot product elements output by the first dot product engine, after transposition.

In either embodiment, the means responsive to said first stream of addresses and the means responsive to said second stream of addresses can comprise means for splitting each of the addresses in said streams into a plurality M of shorter addresses. The bits in each individual shorter address all have the same weight. M look up table means are provided, each associated with one of the plurality of M shorter addresses. The look up table means provide look up values that are scaled according to the weight of the bits contained in the associated shorter address. Means are provided for summing the scaled look up values for successive addresses to provide successive partial dot products.

The means responsive to said first stream of addresses and said means responsive to said second stream of addresses can further comprise means responsive to a sign bit identifier for negating a scaled look up value, prior to use of the scaled look up value in said summing means, when the shorter address responsible for the scaled look up value comprises sign bits.

A method in accordance with the present invention inverse transforms a matrix of discrete cosine transform coefficients having N arrays of M coefficients. An array of transform coefficients is obtained from the DCT matrix. First successive addresses are formed from at least two bits of each of the transform coefficients in the array. Successive first outputs are provided in response to the first successive addresses. The first outputs comprise partial dot products between each of the transform coefficients contained in the array and a DCT kernel matrix. The successive first outputs are accumulated and combined to form a complete dot product for each of the transform coefficients contained in the array. The foregoing steps are repeated for each of the remaining arrays in the DCT matrix to obtain a matrix of N×M complete dot products. The matrix of complete dot products is transposed to provide a transposed matrix having N arrays of M dot product elements. For each array of dot product elements from the transposed matrix, (i) second successive addresses are formed from at least two bits of each of the dot product elements in the array, (ii) successive second outputs are provided in response to the second successive addresses, the second outputs comprising partial dot products between each of the dot product elements contained in the array and the DCT kernel matrix, and (iii) the successive second outputs are accumulated and combined to form a complete dot product for each of the dot product elements contained in the array. The complete dot products for the N arrays of the transposed matrix define a block of N×M inverse transform elements corresponding to the N×M coefficients contained in the block of DCT coefficients. Processing of the arrays of transform coefficients from the DCT matrix and the arrays of dot product elements from the transposed matrix occurs on an interleaved basis.

In a general method for inverse transforming a matrix of discrete cosine transform coefficients, the DCT coefficients are processed at least two bits at a time to obtain the vector dot products thereof with a DCT kernel matrix. A matrix of the vector dot products is transposed to obtain a transposed matrix of dot product elements. The dot product elements of the transposed matrix are processed at least two bits at a time to obtain the vector dot products thereof with the DCT kernel matrix. The resultant vector dot products are the inverse transform elements of the original DCT matrix.

DETAILED DESCRIPTION OF THE PREFERRED EMBODIMENTS

The present invention provides an IDCT processor and method for performing the inverse discrete cosine transform on a block of DCT coefficients. In the specific embodiment illustrated, 8×8 blocks of DCT coefficients are processed. It should be appreciated that the invention can be applied to DCT blocks of any size, for example 16×16 blocks, 32×32 blocks, etc.

The inverse discrete cosine transform can be expressed mathematically as follows:

$$f(x,y) = \sum_{u=0}^{n-1} \sum_{v=0}^{n-1} F(u,v)C(u)C(v)\cos\left(\frac{(2x+1)u\pi}{2n}\right)\cos\left(\frac{(2y+1)v\pi}{2n}\right).$$

F(u,v) are the individual elements of the DCT array, f(x,y) is the pixel matrix resulting from the IDCT, and C(w) is defined as $$C(w) = \begin{cases} \frac{1}{\sqrt{2}} & \text{for } w = 0 \\ 1 & \text{for } w = 1, 2, \ldots, n-1 \end{cases}$$

The above equation can be rewritten as:

$$f(x,y) = \sum_{u=0}^{n-1} \sum_{v=0}^{n-1} F(u,v)k(u,v)$$

where k (u, v) is defined as $$k(u,v) = C(u)C(v)\cos\left(\frac{(2x+1)u\pi}{2n}\right)\cos\left(\frac{(2y+1)v\pi}{2n}\right).$$

The equation can be further reduced by rewriting it using matrix notation, i.e.,:

$$f = (F \cdot k)^t \cdot k$$

where f represents the pixel matrix, F represents the coefficients of the DCT array, and k is a DCT kernel matrix.

The DCT kernel matrix is a constant, and provides the transform weights necessary to provide the inverse transform of the DCT block. An example of a DCT kernel that can be used in accordance with the present invention is as follows:

| 0.71 | 0.71 | 0.71 | 0.71 | 0.71 | 0.71 | 0.71 | 0.71 |
| 0.98 | 0.83 | 0.56 | 0.20 | −0.20 | −0.56 | −0.83 | −0.98 |
| 0.92 | 0.38 | −0.38 | −0.92 | −0.92 | −0.38 | 0.38 | 0.92 |
| 0.83 | −0.20 | −0.98 | −0.56 | 0.56 | 0.98 | 0.20 | −0.83 |
| 0.71 | −0.71 | −0.71 | 0.71 | 0.71 | −0.71 | −0.71 | 0.71 |
| 0.56 | −0.98 | 0.20 | 0.83 | −0.83 | −0.20 | 0.98 | −0.56 |
| 0.38 | −0.92 | 0.92 | −0.38 | −0.38 | 0.92 | −0.92 | 0.38 |
| 0.20 | −0.56 | 0.83 | −0.98 | 0.98 | −0.83 | 0.56 | −0.20 |

As can be seen, the DCT kernel is highly redundant. In fact, the first four columns are the mirror image of the second four columns, with the exception that the odd numbered coefficients of the mirror imaged columns have opposite signs. For example, column 0 is the same as column 7, with the exception that coefficients in rows 1, 3, 5 and 7 have opposite signs. As a result, a read-only memory (ROM) storing the DCT kernel can be reduced in size, by only storing half of the kernel. The locations where the signs differ in the other half of the kernel are known, as indicated above. This information is used to control a post-add stage (described below) to enable a full DCT implementation using only the half DCT kernel which is stored in ROM.

As indicated by the matrix notation for the IDCT equation set forth above, the IDCT can be solved using vector dot products. A vector dot product engine for multiplying variable coefficients with a constant DCT kernel matrix can be implemented using a serial multiplier consisting of a shift register, a ROM, an adder, and an accumulator/shifter. The shifter can be implemented as a divide by two circuit, as well known in the art.

Figure 1:
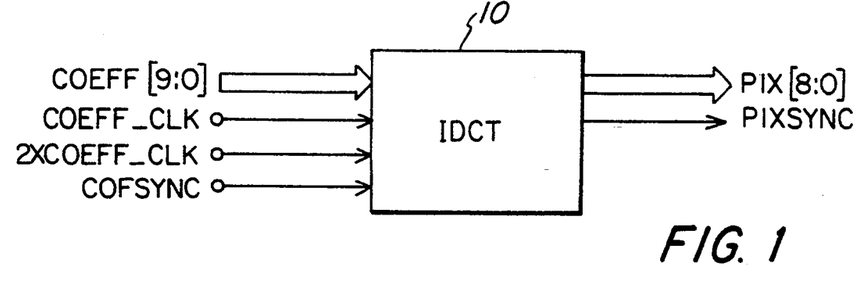
FIG. 1 is a simplified block diagram of an IDCT processor, illustrating the inputs and outputs associated therewith.

FIG. 1 illustrates the inputs and outputs to the IDCT processor. In the illustrated embodiment, which is merely exemplary, ten-bit coefficient data is input via a COEFF input bus. The COEFF_CLK and COF-SYNC signals are used to synchronize the reading of data from the COEFF data bus. IDCT processor 10 performs the inverse discrete cosine transform on the coefficient data and outputs the result as pixels on a nine-bit PIX data bus. PIXSYNC is used to synchronize to the first pixel of an 8×8 block of pixels. After a pipeline delay (e.g., 109 COEFF_CLK cycles) the IDCT outputs one pixel for every coefficient that is input to the processor. A 2XCOEFF_CLK signal (twice the coefficient clock rate) is also input to IDCT processor 10 in accordance with the present invention to enable two bits of coefficient data to be processed at a time with no decrease in throughput.

Figure 3:
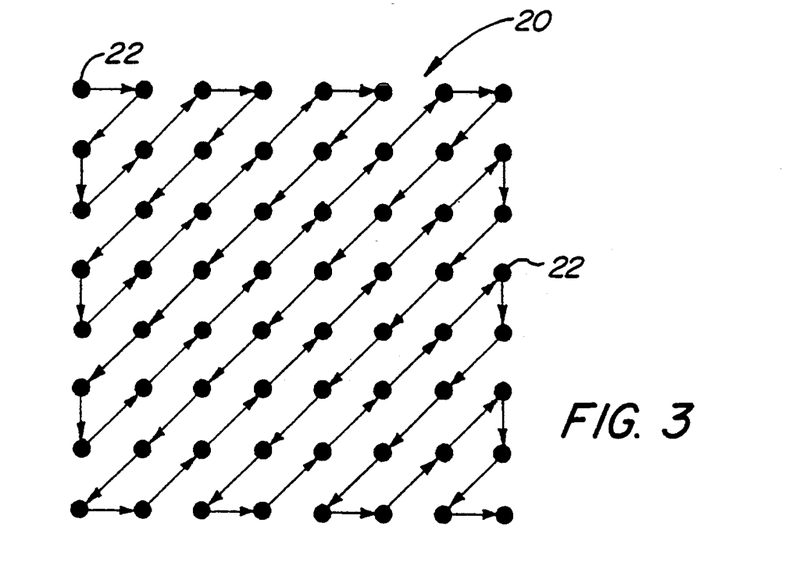
FIG. 3 is a diagram illustrating the zigzag scan order of incoming DCT coefficient data.

The IDCT processor 10 assumes that incoming coefficient data is scanned in a conventional zigzag order, as illustrated in FIG. 3. Zigzag coefficient scanning is used to take advantage of the properties of a block of DCT coefficients, in which the energy is concentrated in the upper left-hand corner. Thus, as illustrated in FIG. 3, an 8×8 block 20 of DCT coefficients 22 is scanned in a zigzag order commencing at the upper left-hand coefficient. The benefit of this technique is that it facilitates the use of Huffman coding, yielding the best compression from the Huffman algorithm as well known in the art. Since the coefficients in the lower right-hand corner of the DCT block are more likely to be zeros, the zigzag scanning order will have the highest likelihood of resulting in a sequence of coefficients which start with the highest magnitude and end with a sequence of zeros which can be runlength encoded for additional compression. The use of zigzag scanning to achieve such advantages is well known.

Figure 2:
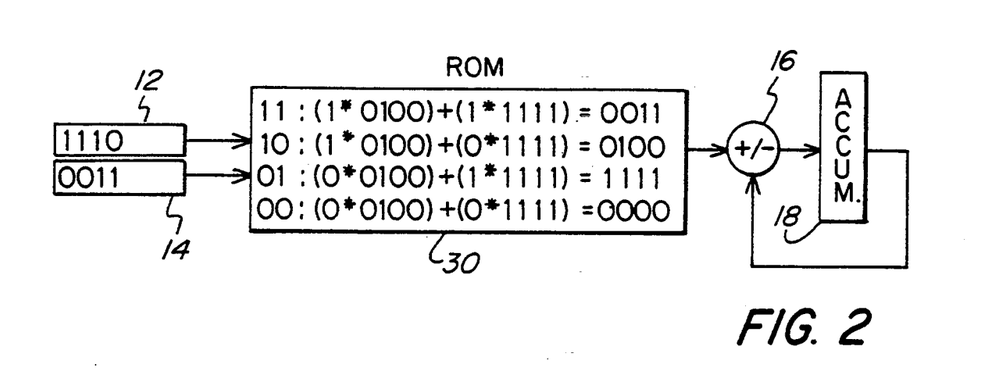
FIG. 2 is a block diagram illustration of a multi-input serial multiplier which is a basic building block off the IDCT processor of the present invention.

FIG. 2 illustrates the generation of a vector dot product using bit serial arithmetic. The simple example of FIG. 2 will process vectors with only two components 12, 14, each four bits in length. A first component 12 of the vector comprises bits 1110. The second component 14 comprises bits 0011. In order to compute the dot product between vector components 12 and 14, it would normally be necessary to provide two multiplications and an addition. For example, where the variable array in FIG. 2 comprises the vector x=(1110, 0011), as illustrated at 12, 14, and the constant k=(0100, 1111), the dot product $$x.k=(1110\times 0100+0011\times 1111)=1001011=-11.$$

ROM 30 stores all of the possible ways that the k vector components can be added. The solutions are addressed by the two least significant bits of each of vector portions 12, 14. After the two least significant bits are used, they are shifted off and the next two least significant bits form the next ROM address. Thus, in the example provided in FIG. 2, the ROM will first be addressed by "01". Next, the ROM will be addressed by "11". Thereafter, the ROM will be addressed by "10". Finally, the ROM will be addressed by the final "10" from array portions 12, 14, respectively. Each time the ROM is addressed, it will output the appropriate partial dot product to an accumulator/shifter 18 via an adder/subtracter 16. The purpose of the shifter in the accumulator 18 is to divide the intermediate results by two for each addition performed. This is necessary to account for the fact that each bit of vector X out of the shift register has twice the weight as the previous bit. The total of the partial dot products continues to be run up in accumulator 18 until all of the two-bit addresses from array portions 12, 14 (one bit each from array portion 12 and array portion 14) have been used. By addressing the ROM two bits at a time to perform bit serial multiplication, the entire dot product is computed in four clock cycles. The present invention reduces the number of required clock cycles by using a plurality of bits from each vector component to address the ROM.

Negative numbers are represented in twos complement format. If any of the components of the constant vector K are negative and result in negative values for the ROM look up table, they are simply stored in the ROM as twos complement negative numbers. If any of the components of the variable vector X are negative, then the sign bits of the vector components (i.e., the last bits to be shifted out of the shift registers containing array portions 12, 14) will address the ROM and the value out of the ROM is subtracted from the accumulator, after the usual shift. Thus, if all the components are positive, all the sign bits are zero, resulting in the subtraction of a zero from the accumulator which does not change the results. On the other hand, if any of the vector components are negative, the result in the accumulator is adjusted by the subtraction. This can be seen in the following summary of the operations that occur in FIG. 2 for the array portions 12, 14 illustrated:

| CLOCK CYCLE | ROM ADDRESS | ACCUMULATOR CONTENTS |
| --- | --- | --- |
| 1 | 01 | 0000000 |
|   |    | + 1111000 |
|   |    | 11111000 |
| 2 | 11 | + 0011000 |
|   |    | 0010100 |
| 3 | 10 | + 0100000 |
|   |    | 0101010 |
| 4 | 10 | − 0100000 |
|   |    | 1001011 |

As seen in the above example, the final value retrieved from the ROM is subtracted from the accumulated total to obtain the final dot product. The subtraction is effected by adder/subtracter 16, which is placed into a subtraction mode for the final iteration.

The bit serial arithmetic example of FIG. 2 can be extended to provide a vector dot product engine that is used to provide an IDCT processor in accordance with the present invention. The invention takes advantage of the fact that matrix multiplication can be achieved by simply taking many vector dot products. The specific implementation of a dot product engine for use in an IDCT processor will depend on the required accuracy of results, the speed at which the IDCT must be calculated, and the required size of the resulting hardware.

Figure 4:
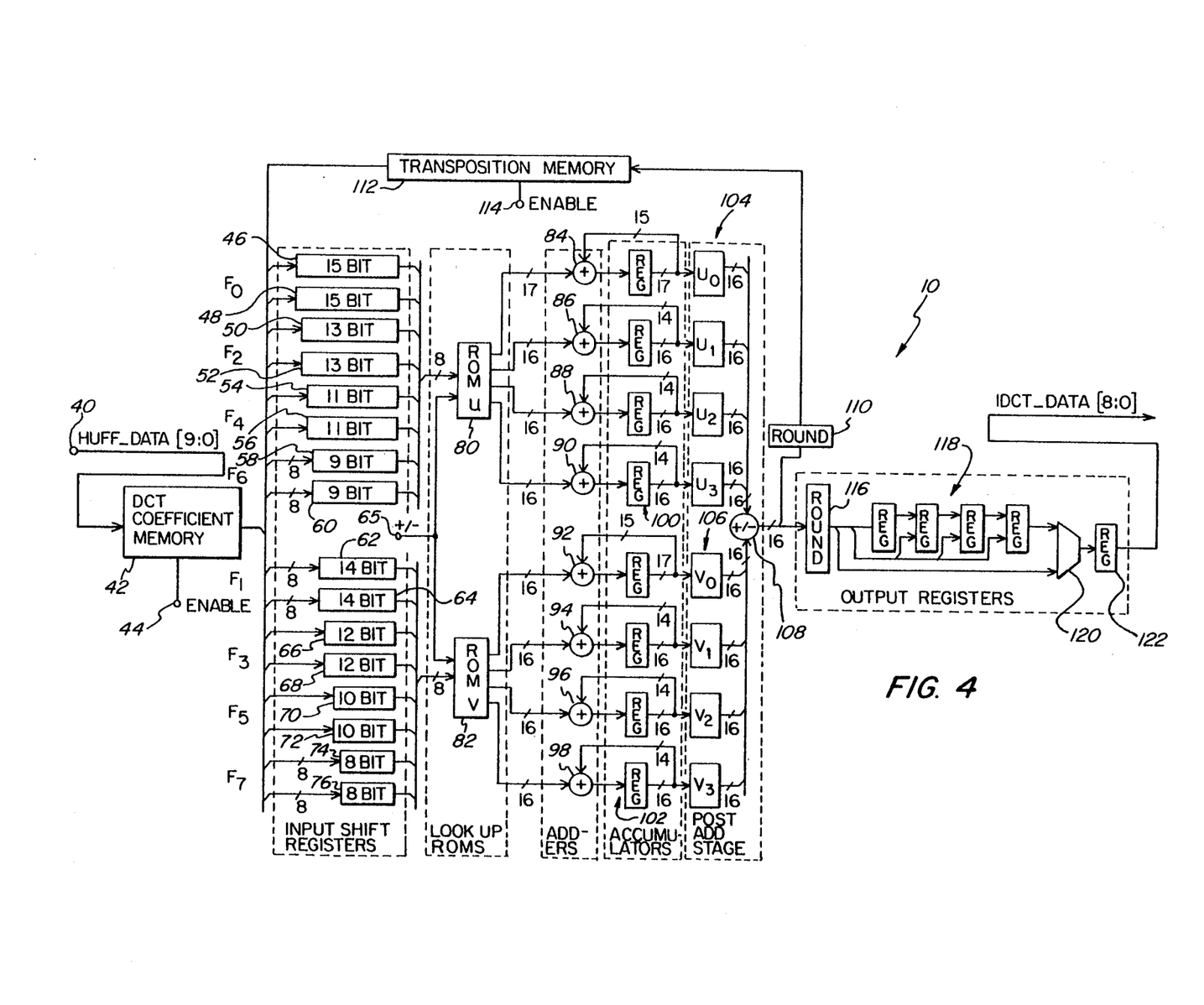
FIG. 4 is a detailed block diagram of a first embodiment of an IDCT processor in accordance with the present invention using a single dot product engine.

FIG. 4 illustrates a preferred embodiment of an IDCT processor utilizing a single vector dot product engine through which multiple passes are made to achieve the desired inverse discrete cosine transform. In accordance with the present invention, the intermediate results for two bits of a DCT coefficient (or a transposed dot product element) are calculated at a time, with corresponding data for two bit addresses stored in the look up ROMs. This enables the vector dot product to be realized in half the time that would be required for single bit processing. In such an implementation, the ROM size doubles. However, the implementation of a IDCT processor using a single dot product engine running at two times the coefficient rate substantially reduces hardware requirements.

In the implementation illustrated in FIG. 4, Huffman data representative of DCT coefficients is input to a DCT coefficient memory 42 via terminal 40. When enabled via terminal 44, memory 42 will output a block of DCT coefficients, one row or column ("array") at a time, to first and second banks of input shift registers. The first bank of shift registers includes shift register pairs 46, 48; 50, 52; 54, 56; and 58, 60. As shown in FIG. 4, the first pair of shift registers (46, 48) are each 15 bits in length. The next pair (50, 52) are 13 bits in length. The next pair (54, 56) are 11 bits in length and the final pair (58, 60) in bank one are nine bits in length. The first bank of shift registers stores and shifts out the even coefficients of an array. For example, if the coefficients in a eight-coefficient array are labeled F0, F1, F2, F3, F4, F5, F6 and F7, the even coefficients are F0, F2, F4 and F6. The odd coefficients are F1, F3, F5 and F7. The odd coefficients are stored in the second bank of shift registers, where the first shift register pair (62, 64) are each 14 bits in length, the second pair (66, 68) are each 12 bits in length, the third pair (70, 72) are each 10 bits in length, and the final pair (74, 76) are each eight bits in length.

Since data is continually being loaded into and shifted out of the input shift registers, the shift registers can be of varying size as illustrated. In the illustrated embodiment, each DCT coefficient is 10 bits in length, with six fill bits (zeros) added thereto to provide 16-bit words for loading into the input shift registers. The eight even bits of the F0 coefficient byte are loaded into shift register 46. The eight odd bits of DCT coefficient byte F0 are loaded into input shift register 48. Eight bits each of 16-bit coefficient byte F1 are loaded into shift registers 62, 64. Subsequent coefficient bytes are loaded into the remaining shift registers in the same manner. By the time that coefficient byte F7 is ready to be loaded into register pair 74, 76, the even eight bits of coefficient byte F0 in shift register 46 and the odd bits thereof in shift register 48 will have progressed to the end of the shift registers, for output in pairs (an even bit from shift register 46 and an odd bit from shift register 48) during successive clock cycles. Since each bit of coefficient byte F7 is input to shift registers 74, 76 eight clock cycles after the corresponding bits of coefficient byte F0 are input to shift registers 46, 48, there is no need to delay the F7 coefficient bits within the shift register, and the shift registers 74, 76 can each be seven bits shorter than shift registers 46, 48.

The four pairs of bits output from the first bank of shift registers 46 to 60 each clock cycle are used to form an eight-bit address for ROM look up table 80. This look up table is equivalent to ROM 30 illustrated in FIG. 2, but on a larger scale. Similarly, ROM 82 is addressed by eight-bit addresses formed from the four two-bit pairs of coefficient data output from the second bank of shift registers 62 to 76. ROMS 80 and 82 each contain a plurality of look up tables, and can be implemented as standard ROM memory chips or as logic gates with associated hardware. The look up tables contain the partial results for the dot products with the kernel matrix and also implement (e.g. using additional hardware) the final subtraction which is required to process addresses that include a sign bit. The sign bit is the most significant bit (MSB) of the address for the final clock cycle of the dot product engine. A terminal 65 receives an extra address bit which directs the ROM section that implements the final subtraction to either add or subtract the current look up value. The extra address bit input to terminal 65 is generated by a state machine (not shown) that keeps track of the dot product engine operation and addresses the proper sections of the ROMs at the appropriate times.

The ROMs also provide entries for the final subtraction necessary in implementing the twos complement arithmetic. By moving this aspect of the accumulator function into the ROMs, it is possible to facilitate the provision of multiple (e.g., two) bit serial arithmetic in accordance with the present invention.

ROM 80 outputs four partial dot products during each cycle for input to adders 84, 86, 88, 90. Similarly, ROM 82 outputs four partial dot products each cycle for input to adders 92, 94, 96, 98. A first bank of registers generally designated 100 and a second bank of registers generally designated 102 accumulate the partial dot products from the ROMs over time. After eight cycles, all of the partial dot products of the DCT coefficients in a current array with the DCT kernel matrix will have accumulated in registers 100, 102 and will be latched into corresponding banks of latches generally designated 104, 106. The latches 104, 106 provide a post-add stage together with adder/subtracter 108. The post-add stage will add or subtract selected accumulated dot products from the first and second banks to implement a post-add stage of an IDCT flowgraph.

Figure 5:
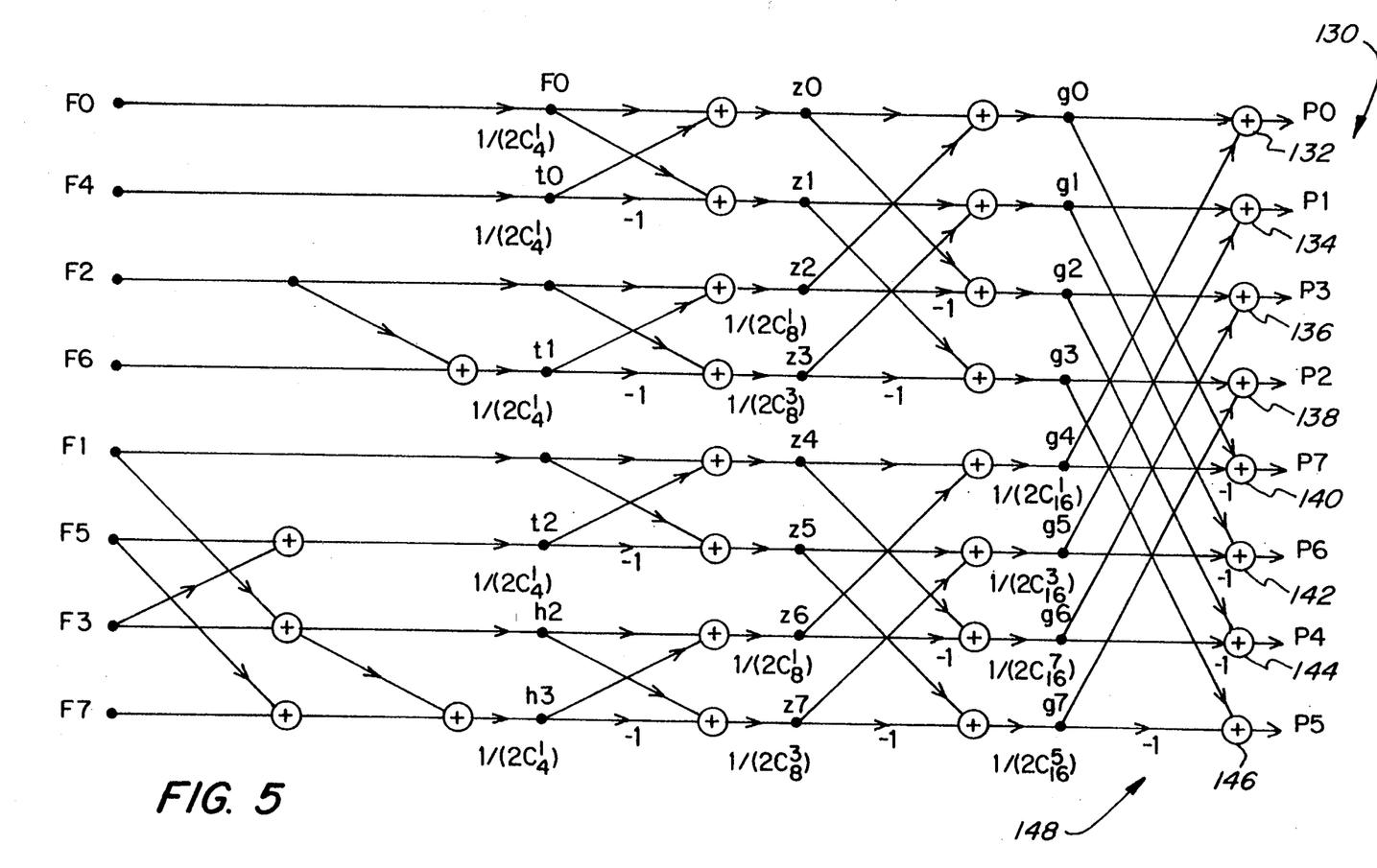
FIG. 5 is a flowgraph illustrating how the periodic nature of an IDCT coefficient matrix can be used to reduce the number of multiplications and additions required by sharing common intermediate results.

An example of an IDCT flowgraph 130 containing a post-add stage generally designated 148 is illustrated in FIG. 5. The flowgraph is used to take advantage of the periodic nature of the IDCT kernel matrix reproduced above. The flowgraph of FIG. 5 is disclosed in B. G. Lee, "A New Algorithm for Computing the Discrete Cosine Transform," *IEEE Transactions of Acoustics, Speech and Signal Processing,* Vol. ASSP-35, No. 10, pp. 1455–1461. The flowgraph attempts to take full advantage of the periodic nature of the IDCT kernel matrix to reduce the number of multiplications and additions to a minimum by sharing common intermediate results. The present invention takes advantage of the final stage of the flowgraph, called the post-add stage, to exponentially reduce the size of ROMs 80, 82 at the small expense of adder/subtracter 108. The post-add stage, comprising adders 132, 134, 136, 138, 140, 142, 144 and 146 in FIG. 5, is easily taken advantage of since it utilizes only additions and subtractions but no multiplications. The post-add stage of the IDCT processor implementation of FIG. 4 calculates final vector dot products (P0 to P7 in FIG. 5) from data g0 to g7 stored in the banks of latches 104, 106. The use of the post-add stage enables the IDCT processor to be provided with ROMs 80, 82 which each require inputs from only four coefficients. As noted above, the four even coefficients (F0, F2, F4, F6) address ROM 80 and the four odd coefficients (F1, F3, F5, F7) address ROM 82.

After the complete dot products are formed for an array of coefficients stored in DCT coefficient memory 42, each successive array from the coefficient memory is processed until complete dot products for all N arrays of the DCT block have been obtained. The complete dot products define an N×N matrix of dot product elements corresponding to the N×N coefficients contained in the DCT coefficient block. These dot product elements are stored in a transposition memory 112, after being rounded off to a desired precision in a conventional unbiased rounding circuit 110. The transposition memory stores the N×N matrix of dot product elements in transposed form, to provide a transposed matrix having N arrays of N elements. Each of the N arrays of dot product elements in the transposed matrix are successively processed in the same manner that the DCT coefficients from memory 42 were processed.

In accordance with the present invention, the processing of arrays (e.g., vectors) from the DCT coefficient memory and arrays (vectors) from the transposition memory is interleaved. Thus, a first pass through the dot product engine will process a first DCT vector to provide a single vector dot product in eight clock cycles. Since each DCT coefficient is sixteen bits in length (10 coefficient bits + 6 fill bits), and all eight coefficients of a vector are processed in parallel two bits at a time to form the addresses for ROMs 80, 82, all eight of the 16 bit coefficients will be processed in eight clock cycles (i.e., one pass through the dot product engine). During the next pass through the dot product engine, a full array of eight, sixteen bit dot product elements from the transposition memory will be processed in the same manner. It will therefore be apparent that after sixteen passes through the dot product engine, a full block of DCT coefficients and a full transpose matrix will have been processed, with the processing of the DCT coefficient arrays interleaved with the processing of the transposed matrix arrays. In order to implement such interleaved processing it is necessary to alternatingly write to and read from the transposition memory on a row/column and then a column/row basis.

An enable signal at terminal 114 of transposition memory 112 inputs the arrays from the transposition memory to the shift registers 46 to 60 and 62 to 76 instead of inputting the DCT coefficients from memory 42 to the shift registers on alternate passes through the dot product engine. Thus, when transposition memory 112 is enabled to output data, DCT coefficient memory 42 is not enabled. Conversely, when DCT coefficient memory 42 is enabled, transposition memory 112 is not enabled to output data.

The dot product engine will accumulate and combine successive partial dot products of the elements output from transposition memory 112 with the DCT kernel matrix. The accumulated partial dot products are then combined in the post-add stage to provide complete dot products for all N arrays of the transposed matrix.

These complete dot products define a block of N×N inverse transform elements corresponding to the N×N coefficients contained in the original block of DCT coefficients. After the dot product engine has processed all of the transposition memory elements of an array, the resulting inverse transform elements are rounded off in standard unbiased round off circuitry 116 and output via output registers generally designated 118, multiplexer 120, and output register 122 in the form of nine-bit words of IDCT data. It should be appreciated that the provision of an entire matrix of inverse transform elements by the dot product engine entails multiple passes therethrough, to access the ROMs the number of times necessary to provide all of the required vector dot products for both the DCT and transposed matrices.

Assembly of the data output from round off circuitry 116 into the proper order is provided by output registers 118, which interleave the even and odd inverse transform elements. The interleaving process also slows down the output of the inverse transform elements to the proper data rate, which is one-half of the dot product engine data processing rate for a two-bit serial arithmetic implementation as shown.

The accuracy of the IDCT processor is controlled through the precision that is carried through the dot product engine. The accuracy is affected by the size of the input coefficients, the size of the constants stored in ROM, the size of the accumulator, and the size of the intermediate results (i.e., transposition memory word width). It is noted that the size of the vector component input to the vector dot product engine directly determines the number of clock cycles required to complete an inverse transform. By utilizing multiple bit serial arithmetic (such as the two-bit processing illustrated in the preferred embodiment), the number of cycles is reduced with respect to single bit processing. For two-bit processing, the number of cycles is cut in half. Although the multiple bit serial approach can be extended to any number of bits, as the number of bits addressing the ROMs is increased, the ROM size will increase exponentially.

In order to ensure compatibility with other IDCT processors, it is advantageous to use very high precision in the vector dot product engine of the present invention. One way to accomplish this is to use extremely wide ROMs and accumulators. It is also possible to calculate the values to be stored in the ROMs with the errors of an IDCT processor to be matched factored in. In this manner, an IDCT processor can be provided which is extremely accurate relative to another IDCT processor being matched.

Figure 6:
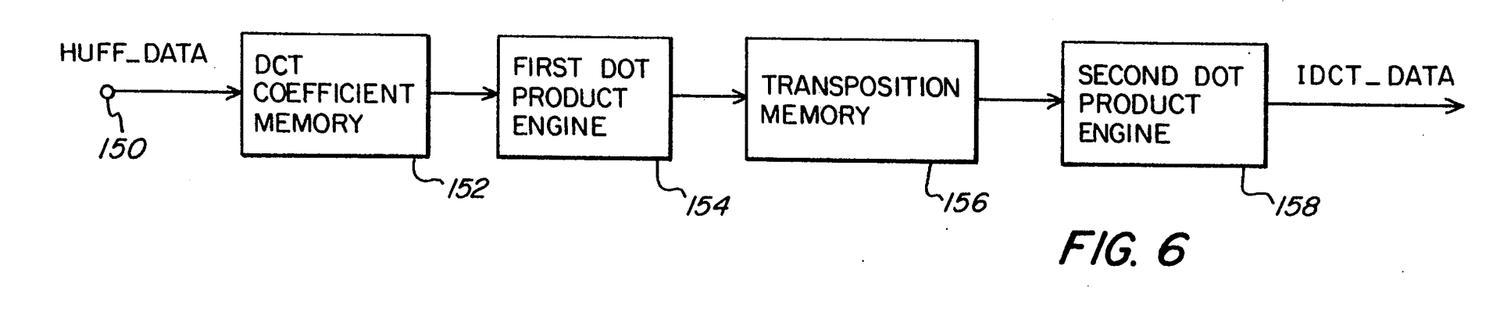
FIG. 6 is a block diagram of an alternate embodiment of an IDCT processor in accordance with the present invention using two dot product engines in series.

FIG. 6 illustrates an alternate embodiment of the present invention in which two separate dot product engines are used. In particular, Huffman data input at terminal 150 is stored in a DCT coefficient memory 152. A first dot product engine 154 computes the dot products of the DCT coefficients with the DCT kernel matrix, one array at a time. The resultant arrays of dot products are transposed and stored in transposition memory 156. The transposed arrays of dot product elements are processed in a second dot product engine 158 to obtain the dot products thereof with the DCT kernel matrix to produce the final IDCT data. Each of the dot product engines 154, 158 are identical to the dot product engine generally designated 10 in FIG. 4, with the exception that there is no feedback of dot products via the transposition memory to the same dot product engine. As in the FIG. 4 implementation, the dot product engines of FIG. 6 process the input data two bits at a time.

Figure 7:
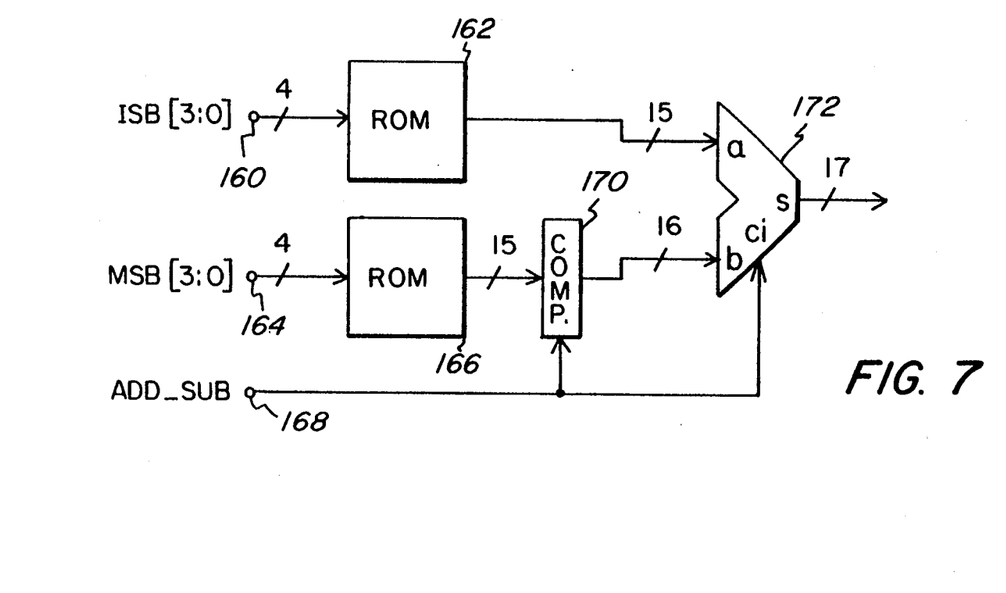
FIG. 7 is a block diagram illustrating a logic implementation of the look up tables used in the IDCT processor of the present invention.

FIG. 7 illustrates a preferred implementation of ROMs 80, 82 wherein the "ROM"s are actually provided by logic gates created using logic synthesis of a case statement, as well known in the art. The four least significant bits of an address are input to a logic decoder "ROM" 162 to provide a 15-bit partial dot product. The most significant bits of the address are input to logic decoder "ROM" 166 via terminal 164 to provide 15 bits of a partial dot product. These 15 bits are inverted, if required due to their status as sign bits, in complement circuit 170 and adder 172 in response to an add/subtract control signal input at terminal 168. Adder 172 outputs the desired partial dot product. The add/subtract control signal is generated by a state machine that initiates a subtraction operation for the final cycle of each partial dot product computation.

The structure of FIG. 7 is the preferred way to implement the final cycle subtraction operation described above, to provide a multiple bit per cycle serial architecture in accordance with the present invention. In particular, such structure significantly reduces the physical size of the look up tables required for the IDCT processor as compared to the use of standard ROMs. Efficiency is achieved by providing the final cycle subtraction operation in the look up tables, instead of in the adders/accumulators downstream therefrom in the IDCT processor.

It should now be appreciated that the present invention provides a novel IDCT processor and method for providing an inverse transform wherein data is processed using a plurality of bits at a time. In a first embodiment, a single dot product engine is used to provide two different sets of vector dot products. The first set of dot products is between the DCT coefficient data and a DCT kernel matrix. The second set of dot products is between the transposed first set of dot products and the DCT kernel matrix. Although most of the processor is based on bit serial distributed arithmetic, it also implements a post-add stage of a traditional flowgraph to provide further efficiency.

The internal functions of the IDCT processor of the present invention are completely pipelined. No task ever waits for the completion of another. Coefficients enter the IDCT and are immediately stored to the zigzag conversion DCT coefficient memory using the inverse zigzag scan order. A vector of coefficients is then transferred one component at a time to the input shift registers. The shift registers address the look up ROMs, with addresses formed from pairs of data output from the shift registers. The outputs of the shift registers are applied to the inputs of adders, whose results are stored in accumulators. After a required number of clock cycles (e.g., eight) the results in the accumulators are transferred to the post-add stage. The post-add stage outputs one vector dot product per clock cycle.

The vector dot products are rounded and stored to a transposition memory. A vector of transposed intermediate results is then transferred one component at a time to the input shift registers. The dot products are once again calculated, but this time they are passed on to output registers for proper ordering and buffering. Each of the functions provided by the dot product engine occur in parallel. Intermediate results are stored to the transposition memory, for example, row ordered and read out column ordered. They are then stored column ordered and read out row ordered. Thus, the order of writing and reading alternates each block.

Although the invention has been described in connection with several preferred embodiments thereof, those skilled in the art will appreciate that numerous adaptations and modifications may be made thereto without departing from the spirit and scope of the invention as set forth in the claims.

I claim:

1. An inverse discrete cosine transform (IDCT) processor for use in recovering pixel data from blocks of DCT coefficients, said blocks each containing N arrays of N coefficients, said IDCT processor comprising:

input means for receiving DCT coefficients at said IDCT processor;

first means for successively processing each of the N arrays in a block of DCT coefficients, said first processing means being disposed at said IDCT processor and including:

means responsive to a clock cycle for forming an address by combining at least two bits from each of the N coefficients contained in an array being processed, wherein a first stream of successive addresses is produced during successive clock cycles;

means responsive to said first stream of addresses for outputting successive partial dot products between each of said N coefficients contained in said array being processed and a DCT kernel matrix; and means for accumulating and combining said successive partial dot products to form a complete dot product for each of the N coefficients of said array being processed, said complete dot products for all N arrays of said block defining an N×N matrix of dot product elements corresponding to the N×N coefficients contained in said block;

means for transposing said N×N matrix of dot product elements to provide a transposed matrix having N arrays of N elements;

second means for successively processing each of the N arrays of dot product elements in said transposed matrix, said second processing means being disposed at said IDCT processor and including:

means responsive to a clock cycle for forming an address by combining at least two bits from each of the N elements contained in an array of said transposed matrix being processed, wherein a second stream of successive addresses is produced during successive clock cycles;

means responsive to said second stream of addresses for outputting successive partial dot products between each of said N elements contained in said array of the transposed matrix being processed and said DCT kernel matrix; and means for accumulating and combining said successive partial dot products for each element of the array of the transposed matrix being processed to form a complete dot product for each element, said complete dot products for all N arrays of said transposed matrix defining a block of N×N inverse transform elements corresponding to the N×N coefficients contained in said block of DCT coefficients; and output means for outputting pixel data corresponding to said inverse transform elements from said IDCT processor.

2. An IDCT processor in accordance with claim 1 wherein said first and second processing means process successive arrays from said block of DCT coefficients and said matrix of transposed dot product elements on an interleaved basis.

3. An IDCT processor in accordance with claim 2 wherein said first and second processing means comprise:

a dot product engine;

means for inputting bits from said block of DCT coefficients during a first pass through said dot product engine to produce an array of said N×N matrix of dot product elements; and means for inputting bits from an array of said transposed matrix during a second pass through said dot product engine to produce an array of said block of N×N inverse transform elements.

4. An IDCT processor in accordance with claim 3 wherein said dot product engine comprises:

shift register means for receiving coefficients from said block of DCT coefficients during said first pass and for receiving dot product elements from said transposed matrix during said second pass, said shift register means being responsive to said clock cycles for outputting said streams of successive addresses; and look up table means responsive to said addresses for outputting said successive partial dot products to said accumulating means.

5. An IDCT processor in accordance with claim 4 wherein:

said shift register means comprise a first bank of shift registers for receiving even coefficients during said first pass and even dot product elements during said second pass and a second bank of shift registers for receiving odd coefficients during said first pass and odd dot product elements during said second pass;

said look up table means comprise a first look up table responsive to addresses produced by said first bank of shift registers and a second look up table responsive to addresses produced by said second bank of shift registers; and said accumulating and combining means comprise a first set of accumulators following said first look up table and a second set of accumulators following said second look up table, each set of accumulators followed by means for alternatingly adding and subtracting selected accumulator outputs to implement a post add stage of an IDCT flowgraph.

6. An IDCT processor in accordance with claim 5 wherein:

said first bank of shift registers comprises N/2 pairs of registers, each pair providing two bits of an N bit address per clock cycle; and said second bank of shift registers comprises N/2 pairs of registers, each pair providing two bits of an N bit address per clock cycle.

7. An IDCT processor in accordance with claim 6 wherein each pair of registers in said first and second banks comprises a first register for storing even bits of DCT coefficients and dot product elements and a second register for storing odd bits of DCT coefficients and dot product elements.

8. An IDCT processor in accordance with claim 7 wherein:

each of said DCT coefficients and said dot product elements are processed in M-bit words;

the pairs of shift registers in said first bank have lengths which successively decline by two, commencing with a length of M-1; and the pairs of shift registers in said second bank have lengths which successively decline by two, commencing with a length of M-2.

9. An IDCT processor in accordance with claim 5 further comprising a plurality of output registers following said means for alternatingly adding and subtracting selected accumulator outputs, for interleaving and buffering even and odd inverse transform elements to provide the inverse transform elements in a desired order at a desired output rate.

10. An IDCT processor in accordance with claim 1 wherein said complete dot products are formed using twos complement arithmetic, with all but the last one of a plurality of successive partial dot products being added to form a sum, and the last partial dot product being subtracted from said sum to provide the complete dot product.

11. An IDCT processor in accordance with claim 2 wherein:

said first processing means comprise a first dot product engine for receiving bits from said block of DCT coefficients to produce arrays of said $N \times N$ matrix of dot product elements; and said second processing means comprise a second dot product engine for receiving bits from said transposed matrix to produce arrays of said block of $N \times N$ inverse transform elements.

12. An IDCT processor in accordance with claim 11 wherein said first and second dot product engines each comprise:

shift register means responsive to said clock cycles for outputting said streams of successive addresses; and look up table means responsive to said addresses for outputting said successive partial dot products to said accumulating means.

13. An IDCT processor in accordance with claim 12 wherein:

said first dot product engine shift register means comprise a first bank of shift registers for receiving even coefficients and a second bank of shift registers for receiving odd coefficients;

said second dot product engine shift register means comprise a first bank of shift registers for receiving even dot product elements and a second bank of shift registers for receiving odd dot product elements;

said look up table means of each dot product engine comprise a first look up table responsive to addresses produced by the first bank of shift registers in the respective dot product engine and a second look up table responsive to addresses produced by the second bank of shift registers in the respective dot product engine;

said accumulator means of each dot product engine comprise a first set of accumulators following the first look up table of the respective dot product engine and a second set of accumulators following said second look up table of the respective dot product engine; and said accumulators are followed by means for alternatingly adding and subtracting selected complete dot products formed in the accumulators to implement a post add stage of an IDCT flowgraph.

14. An IDCT processor in accordance with claim 13 wherein:

said first banks of shift registers each comprise N/2 pairs of registers, each pair providing two bits of an N bit address per clock cycle; and said second banks of shift registers each comprise N/2 pairs of registers, each pair providing two bits of an N bit address per clock cycle.

15. An IDCT processor in accordance with claim 14 wherein each pair of registers in said first and second banks comprises a first register for storing even bits of DCT coefficients or dot product elements and a second register for storing odd bits of DCT coefficients or dot product elements.

16. An IDCT processor in accordance with claim 15 wherein:

each of said DCT coefficients and said dot product elements are processed in M-bit bytes;

the pairs of shift registers in said first banks have lengths which successively decline by two, commencing with a length of M-1; and the pairs of shift registers in said second banks have lengths which successively decline by two, commencing with a length of M-2.

17. Apparatus in accordance with claim 1 wherein said means responsive to said first stream of addresses and said means responsive to said second stream of addresses comprise:

means for splitting each of the addresses in said streams into a plurality M of shorter addresses, with the bits in each individual shorter address all having the same weight;

M look up table means, each associated with one of the plurality of M shorter addresses, for providing look up values that are scaled according to the weight of the bits contained in the associated shorter address; and means for summing the scaled look up values for successive addresses to provide said successive partial dot products.

18. Apparatus in accordance with claim 17 wherein said means responsive to said first stream of addresses and said means responsive to said second stream of addresses further comprise:

means responsive to a sign bit identifier for negating a scaled look up value, prior to use in said summing means, when the shorter address responsible for the scaled look up value comprises sign bits.

19. A method for use by an inverse discrete transform processor to inverse transform a matrix of discrete cosine transform (DCT) coefficients having N arrays of M coefficients, comprising the steps of:

obtaining an array of transform coefficients from said DCT matrix:

forming first successive addresses from at least two bits of each of said transform coefficients in said array;

providing successive first outputs in response to said first successive addresses, said first outputs comprising partial dot products between each of said transform coefficients contained in said array and an array of a DCT kernel matrix;

accumulating and combining said successive first outputs to form a complete dot product for each of said transform coefficients contained in said array;

repeating the foregoing steps for each of the remaining arrays in said DCT matrix to obtain a matrix of $N \times M$ complete dot products;

transposing said matrix of complete dot products to provide a transposed matrix having N arrays of M dot product elements: and for each array of dot product elements from said transposed matrix:

forming second successive addresses from at least two bits of each of said dot product elements in the array;

providing successive second outputs in response to said second successive addresses, said second outputs comprising partial dot products between each of said dot product elements contained in the array and an array of said DCT kernel matrix; and accumulating and combining said successive second outputs to form a complete dot product for each of said dot product elements contained in the array;

wherein the complete dot products for the N arrays of said transposed matrix define a block of $N \times M$ inverse transform elements corresponding to the $N \times M$ coefficients contained in said block of DCT coefficients.

20. A method in accordance with claim 19 wherein the arrays of transform coefficients from the DCT matrix and the arrays of dot product elements from the transposed matrix are processed on an interleaved basis.

21. A method for use by an inverse discrete transform processor to inverse transform a matrix of discrete cosine transform (DCT) coefficients, comprising the steps of:

processing said matrix of DCT coefficients at least two bits at a time to obtain the vector dot products thereof with a DCT kernel matrix;

transposing a matrix of said vector dot products to obtain a transposed matrix of dot product elements; and processing said dot product elements of said transposed matrix at least two bits at a time in an interleaved format with said DCT coefficients to obtain the vector dot products thereof with said DCT kernel matrix.

* * * * *